United States Patent
Thibodeaux

(10) Patent No.: US 9,964,246 B2
(45) Date of Patent: May 8, 2018

(54) HOSE CRIMP FITTING OR HYDRAULIC ADAPTORS THAT UTILIZE A REVERSE THREADED LOCK NUT THAT ENGAGES TO A JIC NUT OR SIMILAR SWIVEL NUT TO PREVENT THE NUT FROM LOOSENING

(71) Applicant: Mike Thibodeaux, Houston, TX (US)

(72) Inventor: Mike Thibodeaux, Houston, TX (US)

( * ) Notice: Subject to any disclaimer, the term of this patent is extended or adjusted under 35 U.S.C. 154(b) by 127 days.

(21) Appl. No.: 15/092,692

(22) Filed: Apr. 7, 2016

(65) Prior Publication Data

US 2017/0051858 A1    Feb. 23, 2017

Related U.S. Application Data

(60) Provisional application No. 62/206,902, filed on Aug. 19, 2015.

(51) Int. Cl.
*F16L 33/207*        (2006.01)
*F16L 19/00*        (2006.01)

(52) U.S. Cl.
CPC ......... *F16L 33/2073* (2013.01); *F16L 19/005* (2013.01)

(58) Field of Classification Search
CPC . F16L 33/2071; F16L 33/207; F16L 33/2073; F16L 33/2076
USPC .................................................... 285/256
See application file for complete search history.

(56) References Cited

U.S. PATENT DOCUMENTS

| | | | | |
|---|---|---|---|---|
| 2,829,671 A | * | 4/1958 | Ernst | F16L 33/24 285/256 |
| 2,917,975 A | * | 12/1959 | Webster | B23C 5/26 279/8 |
| 3,140,106 A | * | 7/1964 | Thomas | F16L 33/01 285/256 |
| 3,999,781 A | * | 12/1976 | Todd | F16L 33/2076 285/256 |
| 6,447,017 B1 | * | 9/2002 | Gilbreath | F16L 33/2075 285/256 |
| 6,848,475 B2 | * | 2/2005 | Smith | G05D 16/2013 137/625.65 |

* cited by examiner

*Primary Examiner* — David E Bochna
(74) *Attorney, Agent, or Firm* — The Petruzzi Law Firm; James D. Pentruzzi

(57) ABSTRACT

A tubular hose stem with a flange, a first left hand threaded section on the outer surface of the stem generally adjacent the flange, a first JIC/swivel nut over the flange having an inner diameter smaller than the outer diameter of the flange, a second lock nut threadably engaged to the hose stem on a second left threaded section adjacent the JIC nut, a conical washer fixedly secured around the hose stem between the first and second threaded sections, an O-ring positioned adjacent the washer opposite the left side of the washer; and a ferrule having a first end fixedly threaded to the hose stem and having a second end larger in diameter than the stem. The lock nut may have knurled surfaces and the inner diameter of the ferrule and outer diameter of the stem may have circumferential raised ribs to engage hosing.

19 Claims, 3 Drawing Sheets

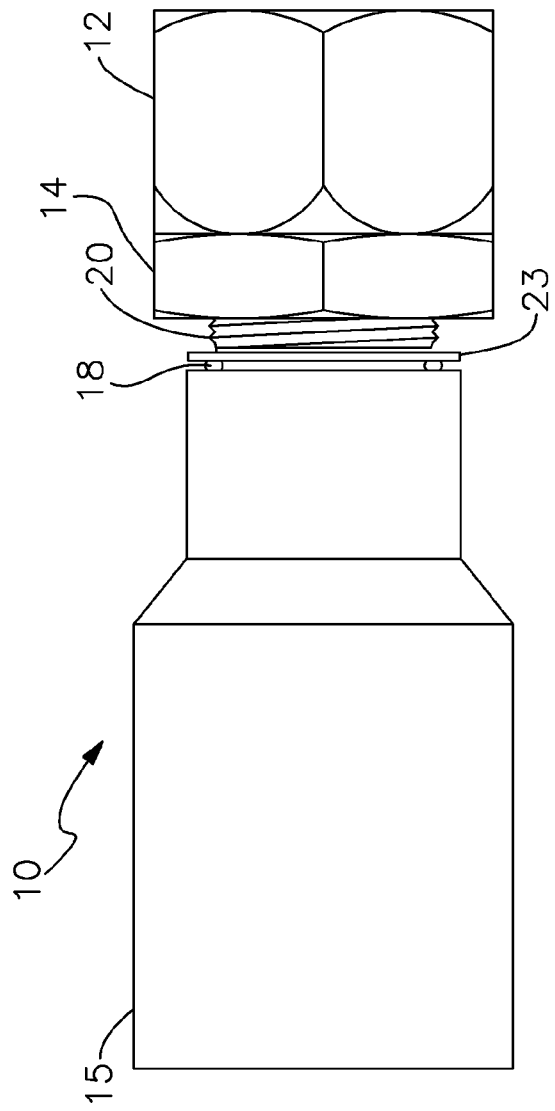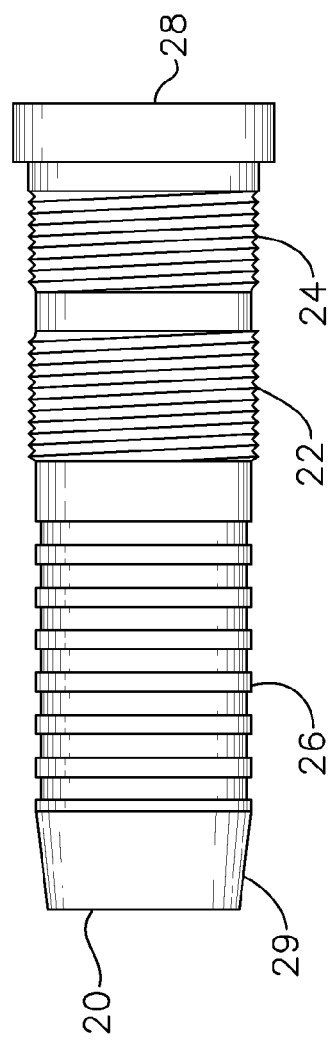

US 9,964,246 B2

HOSE CRIMP FITTING OR HYDRAULIC ADAPTORS THAT UTILIZE A REVERSE THREADED LOCK NUT THAT ENGAGES TO A JIC NUT OR SIMILAR SWIVEL NUT TO PREVENT THE NUT FROM LOOSENING

CROSS REFERENCE TO RELATED APPLICATIONS

This application takes priority from provisional application for patent entitled "Hose crimp fitting or hydraulic adaptors that utilize a reverse threaded lock nut to prevent a JIC swivel nut from loosening" filed Aug. 19, 2015 bearing Ser. No. 62/206,902 and is incorporated as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of pipe fittings and more particularly to a hose crimp fittings or hydraulic adaptors that utilize a reverse threaded lock nut to prevent a swivel nut from loosening.

Existing and commonly used hose crimp fittings utilize 37 degree JIC sealing technology, which is the most popular metal-to-metal seal for hydraulic hoses. They are extremely sensitive to proper make-up torque and are leak prone due to hydraulic shock in the hose causing the JIC or swivel nut to back-off, resulting in a leak of hydraulic fluid to the environment, and or sluggish function activation. In various applications, the vibrations of the system cause the JIC nut or other similar swivel nuts to progressively rotate thereby loosening its connection and causing leaks and failure.

In subsea applications, this is particularly acute due to the high pressures involved and constant vibratory environment. Current systems are highly prone to dislodge and prevent the hose from working properly.

The present invention overcomes these problems through use of an innovative combination of a hose stem with two left handed threaded portions that receive a ferrule and lock nut to prevent the JIC or other similar swivel nuts from rotating under vibration.

BRIEF SUMMARY OF THE INVENTION

In accordance with a preferred embodiment of the present invention, there is shown a hose fitting assembly having a tubular hose stem having a flange extended on one end of the stem, a first left threaded section on the outer surface of the hose stem generally adjacent the flange and a second left hand threaded section and adjacent the flange, a first JIC/swivel nut positioned over the flange having internal right hand threads and an inner diameter smaller than the diameter of the flange, a left hand threaded second nut (lock nut) threadably engaged to the hose stem on the second left hand threaded section adjacent the JIC/swivel nut on the side opposite where the JIC/swivel nut engages with the flange, a conical washer fixedly secured around the hose stem between the first and second threaded sections, an O-ring positioned adjacent the left side of the washer and a ferrule having a first end fixedly threaded to the hose stem and having a second end larger in diameter than the hose stem.

In accordance with another preferred embodiment of the present invention, there is shown a hose fitting assembly having a tube having a flange extended on one end of the tube, a first left hand threaded section on the outer surface of the tube generally adjacent the flange and a second left hand threaded section adjacent the flange, a first JIC/swivel nut positioned over the flange having internal right hand threads and an inner diameter smaller than the diameter of the flange, a left hand threaded second nut (lock nut) threadably engaged to the tube on the second left hand threaded section adjacent the JIC/swivel nut on the side opposite where the JIC/swivel nut engages with the flange; a conical washer fixedly secured around the hose stem between the first and second threaded sections, an O-ring positioned adjacent the left side of the washer and a ferrule having a first end fixedly threaded to the tube and having a second end larger in diameter than the tube.

In accordance with yet another embodiment of the present invention there is shown an apparatus having a cylindrical member having a flange extended on one end of the member, a first left hand threaded section on the outer surface of the member generally adjacent the flange and a second left hand threaded section adjacent the flange, a first JIC/swivel nut positioned over the flange having internal right hand threads on its inside diameter and an inner diameter smaller than the diameter of the flange, a left hand threaded second nut (lock nut) threadably engaged to the member on the second left hand threaded section adjacent the JIC/swivel nut on the side opposite where the JIC/swivel nut engages with the flange; a conical washer fixedly secured around the hose stem between the first and second threaded sections, an O-ring positioned adjacent the left side of the washer and a ferrule or second cylindrical member having a first end fixedly threaded to the cylindrical member and having a second end larger in diameter than the first cylindrical member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a side view of the complete assembly consisting of a reverse threaded lock nut, JIC/swivel nut, hose stem, ferrule, O-ring and conical washer according to a preferred embodiment of the invention.

FIG. 2 is a partial cutaway of an assembly showing the hose stem, tube or cylindrical member according to a preferred embodiment of the invention.

DETAILED DESCRIPTION OF THE PREFERRED EMBODIMENTS

Figure 3A:
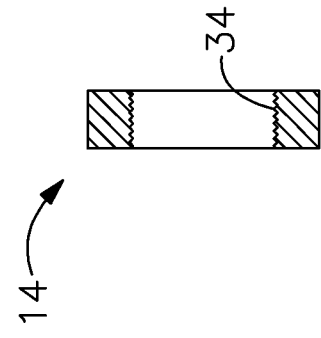
FIGS. 3A, 3B and 3C are plane, side and cross sections views respectively of a lock nut having left handed internal threads used with a preferred embodiment of the invention.

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

Turning now to FIG. 1, there is shown an assembly 10 with a JIC/swivel nut 12, lock nut 14, hose stem 20, O-ring 18, conical washer 23 and ferrule 15. Assembly 10 includes hose stem 20 having two left hand threaded sections 22 and 24. Hose stem 20 is typically of a tubular or cylindrical configuration with a hollow central section. Threaded section 22 is left hand external threaded in a preferred embodiment and is designed to receive ferrule 15 via mating left handed internal threading more fully shown in FIG. 5. Ferrule 15 is typically of a cylindrical or tubular configuration. Threaded section 24 is left hand external threaded in a preferred embodiment and is designed to receive a lock nut with left hand internal threading as more fully described below.

To assemble assembly 10, first JIC/swivel nut 12 is sleeved over hose stem 20 until it stops at flange 28 by virtue of the diameter 39 being smaller than flange 28. Flange 28 in some cases may have a beveled inner diameter, not shown, for contact to a typical male counterpart that is the sealing contact point threadably engaged by the JIC/swivel nut 12. In a second step, lock nut 14 is threaded via left hand internal threading over external threaded section 22 and resting on external threaded section 24. In a third step, one installs conical washer 23 by sleeving conical washer over hose stem 20 and over threaded section 22 until resting between threaded sections 22 and 24. In a fourth step, one presses the conical washer flat by use of a press (not shown) which permanently positions the washer between threaded sections 22 and 24. By pressing the conical washer, it flattens out and thereby alters the inner diameter of the washer so that it's smaller than the outer diameter of each threaded sections 22 and 24.

In a fifth step, one sleeves O-ring 18 over hose stem 20 and over threaded section 22 until O-ring 18 rests against now flattened conical washer 23. In a sixth and final assembly step, one installs ferrule 15 by sleeving over hose stem 20 followed by threading onto threaded section 22 until ferrule meets and seals against O-ring 18 supported by conical washer 23. Once assembly is completed, assembly 10 can now be crimped on desired hose. Right handed JIC/swivel nut 12 can now be attached to customers' existing male external JIC threads (or any other suitable fitting) once JIC nut 12 is secured the left hand threaded lock nut 14 can be tightened up against the right hand threaded JIC/swivel nut 12 to create a tight fit and prevent JIC nut 12 from backing off and leaking.

JIC nut 12 commonly referred to as a swivel nut is tightened by right hand threading to recommended torque or FFWR (flats from wrench resistance). While holding JIC nut 12 in place, lock nut 14 is tightened against JIC nut 12 in a reverse direction. JIC nut 12 may be any of a variety of swivel nuts engaged about flange 28 and that typically are connected to a male member via right handed threading.

FIG. 2 further shows on hose stem 20, a male tapered end 29 and a series of ribs 26 for stable engagement to a hose that may be made of rubber, plastic, or other synthetic materials. Ribs 26 may be configured in any of a variety of spacing, sizes, depths, thickness', angles and numbers to achieve the desired fitting purpose. Typically ribs 26 are circumferential but may be partially surrounding or circumferentially angled depending on hose type.

Figure 3B:
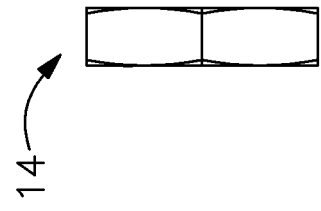
Figure 3C:

FIGS. 3A, 3B, and 3C show lock nut 14 with knurled faces 38 for further engagement to JIC nut 12 once tightened. As is readily apparent, by using left handed threading on lock nut 14, against right handed JIC nut 12, this restricts the loosening of either nut by physics of opposite force and thread jamming. JIC nut 12 cannot be loosened until lock nut 14 is loosened and free from contact from JIC nut 12. This combination makes the JIC nut virtually impossible to dislodge or vibrate loose and maintains a tight fit between JIC nut 12, hose stem 20 and customers' existing male external JIC thread (or other suitable fitting).

Figure 4A:
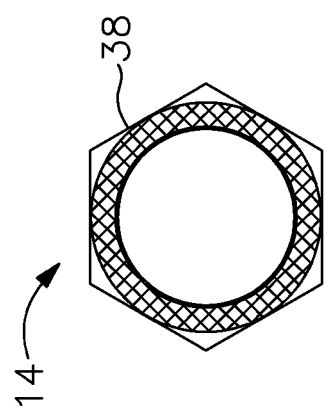
FIGS. 4A, 4B, and 4C are plane, side and cross sections views respectively of a JIC/swivel nut having right handed internal threads used with a preferred embodiment of the invention.
Figure 4B:
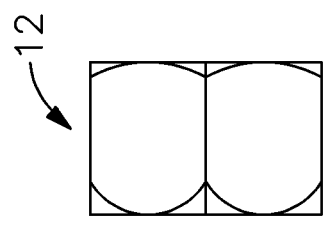
Figure 4C:
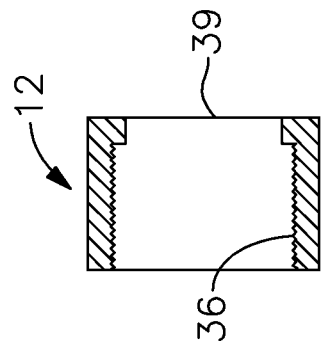

FIG. 3C shows internal left handed threading on lock nut 14 for engagement to left handed threaded section 24 on hose stem 20. FIGS. 4A, 4B and 4C show JIC/swivel nut 12 having right handed threading 36 for engagement to other male external fittings not shown. As previously described, JIC/swivel nut 12 has a smaller internal diameter 39 that is designed to engage flange 28 of hose stem 20 upon assembly allowing the nut to swivel freely until tightened onto male external threading.

Figure 5:
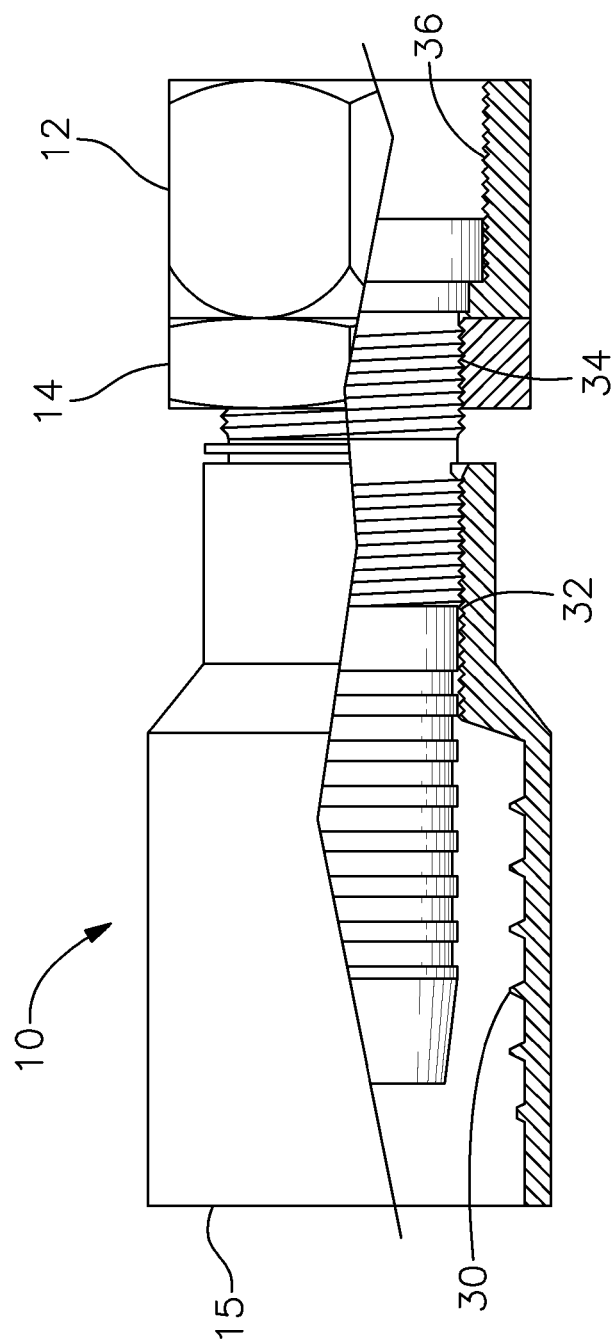
FIG. 5 is a partial cutaway view of the complete assembly according to a preferred embodiment of the invention.

FIG. 5 shows a partially cutaway view of a complete assembly 10 having ferrule 15 threaded onto threaded section 22 via internal left hand threading 32. On the portion of ferrule 15 that is positioned over and around ribs 26 of hose stem 20, there are a series of engaging rings 30 that upon crimping/swaging of ferrule 15 around a hose fitted onto hose stem 20 fixedly engage the hose and maintain its connection to the assembly. Engaging rings 30 are typically on the inside diameter of ferrule 15 and may partially or entirely circle the inside diameter. They may also be configured in various sizes, depths or angles. Ferrule 15 has an inside diameter that is larger than the outside diameter of hose stem 20 and may have on one end an inside diameter that is threaded to matably engage the left threading 22 on hose stem 20.

As is readily apparent, a family of JIC/swivel lock nut hose ends/adaptors may be developed and used on a wide range of equipment. They may be used as previously noted in the subsea oil & gas industry where JIC/swivel fittings are currently backing off and leaking (i.e. Subsea B.O.P. (Blow Out Preventers and control systems). However, the lockable JIC/swivel hose end fittings can be used literally in any application where JIC or other swivel nut connections are subject to loosen under head hydraulic impulse and vibration to increase the overall reliability. Interchangeable ferrules 15 can be developed for multiple hose types and different sizes.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the later issued claims.

The invention claimed is:

1. A hose fitting assembly comprising:
   a. a tubular hose stem having a flange extended on one end of the stem;
   b. a first left threaded section on the outer surface of the hose stem generally adjacent the flange;
   c. a right hand threaded first JIC/swivel nut positioned over the flange having an inner diameter smaller than the outer diameter of the flange;
   d. a left hand threaded second lock nut threadably engaged to the hose stem on the first left threaded section on the outer surface of the hose stem adjacent the JIC nut on the side opposite where the JIC nut engages with the flange;

e. a conical washer fixedly secured around the hose stem between the first left threaded section and a second threaded section adjacent said first left threaded section;

f. an O-ring positioned adjacent the washer opposite the second threaded section or left side of the washer; and g. a ferrule having a first end fixedly threaded to the hose stem on the second threaded section and having a second end larger in diameter than the hose stem.

2. A hose fitting assembly as claimed in claim 1 further comprising circumferential ribs on the opposite end from the flange on the outer surface of the stem for engagement to the tubular hose.

3. A hose fitting assembly as claimed in claim 1 further comprising a male tapered end on the stem on the opposite end from the flange.

4. A hose fitting assembly as claimed in claim 1 wherein the second nut (lock nut) has knurled surface on one side or both sides of the nut that engages the JIC/swivel nut upon tightening.

5. A hose fitting assembly as claimed in claim 1 wherein the ferrule has a plurality of circumferential ridges on the inside diameter of the ferrule.

6. A hose fitting assembly apparatus as claimed in claim 1 further comprising mating threading on the inner diameter of the first end of the ferrule for engagement to the second threaded section of the hose stem.

7. A hose fitting assembly comprising:
a. a tube having a flange extended on one end of the stem;
b. a first left hand threaded section on the outer surface of the tube generally adjacent the flange;
c. a right hand threaded first JIC/swivel nut positioned over the flange having an inner diameter smaller than the diameter of the flange;
d. a left hand threaded second nut threadably engaged to the tube on the first threaded section on the outer surface of the hose stem adjacent the JIC nut on the side opposite where the JIC nut engages with the flange; and
e. a ferrule having a first end fixedly threaded to the hose stem on a second threaded section on the tube and having a second end larger in diameter than the hose stem.

8. A hose fitting assembly as claimed in claim 7 further comprising a male tapered end opposite the flange end.

9. A hose fitting assembly as claimed in claim 7 wherein the stem has a plurality of raised ribs surrounding one end of the stem.

10. A hose fitting assembly as claimed in claim 7 wherein the ferrule has matable threading for stable connection to the second threaded section.

11. A hose fitting assembly as claimed in claim 7 further comprising a washer between the ferrule and second nut.

12. A hose fitting assembly as claimed in claim 11 wherein the washer is conical.

13. A hose fitting assembly as claimed in claim 7 wherein the ferrule has raised ribs on the inner surface of its diameter.

14. An apparatus comprising:
a. a cylindrical member having a circumferential flange extended on one end of the member;
b. a first left hand threaded section on the outer surface of the member generally adjacent the flange;
c. a first JIC or swivel nut positioned over the flange having right handed threading on its inside diameter and a second inner diameter smaller than the outer diameter of the flange;
d. a left hand threaded second nut threadably engaged to the member on the first left hand threaded section adjacent the JIC or swivel nut on the side where the JIC or swivel nut engages with the flange; further comprising a second threaded section adjacent the first left hand threaded section.

15. An apparatus for connecting as claimed in claim 14 further comprising an O-ring and washer between the first and second threaded sections.

16. An apparatus for connecting as claimed in claim 14 further comprising a second cylindrical member threadably engageable to the second threaded section of the first cylindrical member.

17. An apparatus for connecting as claimed in claim 14 further comprising circumferential raised rings on the outer diameter of the first cylindrical member.

18. An apparatus for connecting as claimed in claim 14 further comprising a knurled surface on the second nut.

19. An apparatus for connecting as claimed in claim 14 wherein the second threaded section is left handed.

* * * * *